(12) United States Patent
Brandsam et al.

(10) Patent No.: US 7,351,172 B2
(45) Date of Patent: Apr. 1, 2008

(54) SCRATCH PREVENTING METAL PUSH BELT AND OIL SPECIFICATION

(75) Inventors: Arjen Brandsam, Tilburg (NL); Mark Van Drogen, Tilburg (NL); Sebastiaan Pieter Hendricus Jozef Bongers, Nijmegen (NL)

(73) Assignee: Van Doorne's Transmissie B.V., Tilburg (NL)

( * ) Notice: Subject to any disclaimer, the term of this patent is extended or adjusted under 35 U.S.C. 154(b) by 327 days.

(21) Appl. No.: 11/171,407

(22) Filed: Jul. 1, 2005

(65) Prior Publication Data
US 2005/0261096 A1 Nov. 24, 2005

Related U.S. Application Data

(62) Division of application No. 10/029,249, filed on Dec. 28, 2001, now Pat. No. 6,945,890.

(30) Foreign Application Priority Data

Dec. 28, 2000 (EP) ................................. 00204818

(51) Int. Cl.
*F16G 5/16* (2006.01)
*F16G 1/26* (2006.01)

(52) U.S. Cl. ...................................... 474/242; 474/201

(58) Field of Classification Search ............... 474/201, 474/240, 242–245; 508/192, 232, 293, 295, 508/469, 559

See application file for complete search history.

(56) References Cited

U.S. PATENT DOCUMENTS

| | | | |
|---|---|---|---|
| 4,332,575 A | | 6/1982 | Hendriks |
| 4,643,702 A | * | 2/1987 | Cuypers ..................... 474/242 |
| 4,719,025 A | * | 1/1988 | Akiyama et al. ........... 508/499 |
| 4,968,288 A | * | 11/1990 | Lecouturier et al. ........ 474/242 |
| 5,004,450 A | * | 4/1991 | Ide .............................. 474/242 |
| 5,152,722 A | * | 10/1992 | Yamada ....................... 474/240 |
| 5,169,369 A | * | 12/1992 | Masuda et al. ............. 474/242 |
| 5,641,732 A | * | 6/1997 | Bloch et al. ................ 508/232 |
| 6,045,474 A | | 4/2000 | Smeets et al. |
| 6,090,004 A | * | 7/2000 | Kanehara et al. ........... 474/242 |

(Continued)

FOREIGN PATENT DOCUMENTS

EP         291006 A2  * 11/1988

(Continued)

*Primary Examiner*—Marcus Charles
(74) *Attorney, Agent, or Firm*—Young & Thompson

(57) ABSTRACT

A composite driving belt provided with a carrier and a plurality of transverse elements assembled slidably thereon, the carrier including one or more bands, preferably composed of a plurality of endless metal bands disposed radially around each other, each element being provided with a radially outward directed carrier contact plane for contacting a radial inner contact plane of the carrier while in operation, wherein the contacting plane of the transverse element is shaped by an substantially flat surface, while the inner contacting face of the carrier contacting the contact plane the element has a profiled surface, the combined roughness Ra' of both surfaces being more than 0.6 μm, preferably over 0.75 μm. In particular the roughness and shape of the relevant contacting faces of a belt are adapted to achieve a boundary lubricating condition, while the lubricating oil is defined to meet the requirements of prohibiting the occurrence of scratch, at least reducing the urging thereof considerably.

14 Claims, 3 Drawing Sheets

U.S. PATENT DOCUMENTS 6,273,837 B1 * 8/2001 Yoshida et al. ............. 474/242
6,629,904 B2 10/2003 Fujioka et al.

FOREIGN PATENT DOCUMENTS

| | | |
|---|---|---|
| EP | 0 909 907 | 4/1999 |
| EP | 0 931 959 | 7/1999 |
| EP | 0 997 670 | 5/2000 |
| EP | 1736530 A1 * | 12/2006 |
| JP | 60 095234 | 5/1985 |
| JP | 60-95244 A | 5/1985 |
| JP | 61140306 A * | 6/1986 |
| JP | 01269760 A * | 10/1989 |

* cited by examiner

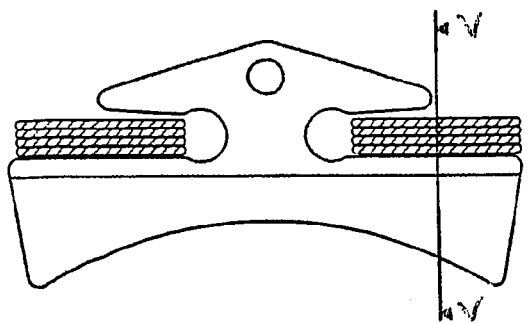
FIG. 4
FIG. 5
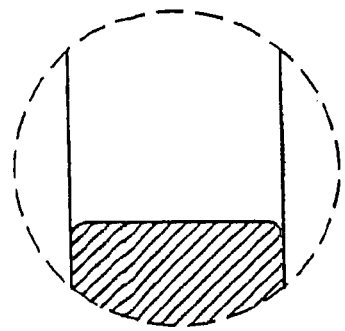
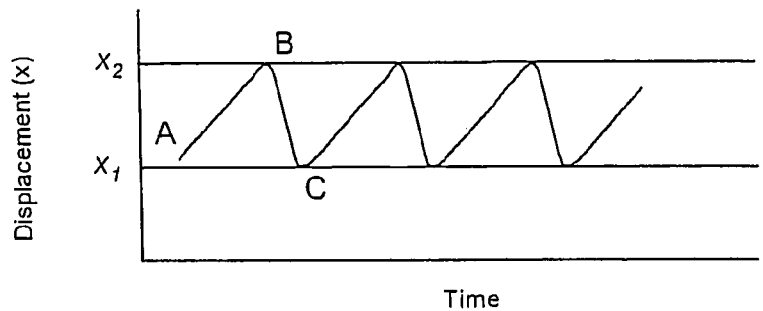
FIG. 6
FIG. 7
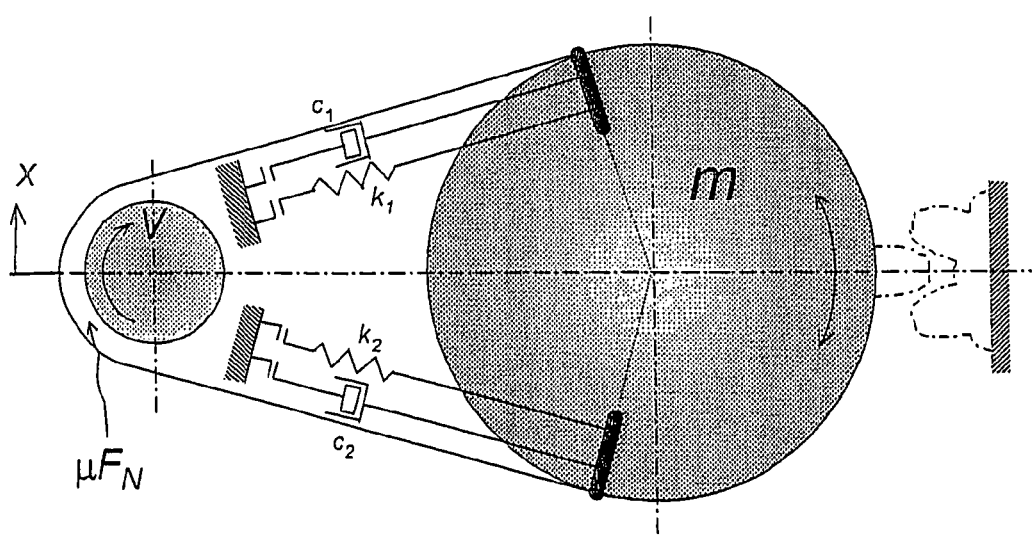
FIG. 8

SCRATCH PREVENTING METAL PUSH BELT AND OIL SPECIFICATION

CROSS REFERENCE TO RELATED APPLICATIONS

This application is a division of application Ser. No. 10/029,249, filed on Dec. 28, 2001, and issued as U.S. Pat. No. 6,945,890, the entire contents of which are hereby incorporated by reference.

BACKGROUND OF THE INVENTION

The invention relates to a composite driving belt provided with a carrier and a plurality of transverse elements assembled slidably thereon.

DESCRIPTION OF THE RELATED ART

Such Belt is generally known, e.g. described in U.S. Pat. Nos. 3,720,113 and 4,080,841. In the known belt, a carrier, alternatively denoted tensile element or tensile means, is composed as a package of a number of endless metal bands. The known belt may in particular be applied in a variable transmission, whereby the driving belt runs over pulleys, the substantial conical sheaves of which are adapted to be displaced axially relative to each other so that the running diameter of the driving belt over the pulley may vary. In turn, while the belt is in operation, the carrier or band package slides over a contact face, the so-called saddle part of the transverse elements. Also, the separate bands of the package slide relatively to each other during operation.

In practice the driving belt, in particular each of the bands, is under a very high tension, on the one hand to ensure a proper frictional contact between the pulleys and the transverse elements and on the other hand to properly conduct the transverse elements in the straight part of the driving belt, i.e. to prevent the belt, in particular the transverse elements in the straight trajectory part of the belt from splashing apart.

The known belts of the current type perform satisfactorily, however may be applied in a transmission environment where the lubrication oil is not of a type optimal for CVT due to standardisation at a manufacturer, may also be applied where mechanical parts are for sake of costs not chosen such that gears are incorporated in an optimally meshing manner or, alternatively, the gears are incorporated non-pre-tensioned in the transmission. Also where costs are saved on isolation of the engine and transmission room, irritating noise may arise from the drive train of a vehicle and may disturb the driver thereof. The sounds of such noise is known to originate from gear wheels within the drive train of the vehicle, rotating impaired during operating of a vehicle and is commonly denoted "rattle" or "gear rattle". Also the term "scratch" is used.

SUMMARY OF THE INVENTION

The present invention seeks to contribute to the solving of such rattle problem by providing a belt design which is not prone, at least considerably less than the known belt, to urge meshing gear wheels into a state of vibration causing the rattle.

According to an idea and a tribological insight underlying the invention and considered part thereof, the belt may during operation of a drive train run in varying conditions, influencing the coefficient of friction in the frictional contact between the carrier of the belt and the transverse elements thereof. With a belt construction in accordance with the invention, it is effected in accordance with the tribological insight underlying the invention, that the belt will run in a condition where the coefficient of friction is no longer, at least considerably less prone to change in operating conditions. In this manner, be it to the extend of some efficiency loss of the belt performance, the belt may be incorporated in a drive train with a view to solving the "rattle" problem thereof.

In particular the roughness of each contacting surface of element and carrier is produced in such roughness that this factor becomes dominant over other factors influencing the lubrication state. E.g. by the relatively high peaks which may be recognised in a high Ra value surface, the lubricating oil will be influenced such that even at high relative speeds, or even with a hydrodynamic or full film lubrication promoting shape of the element contact surface, the oil film in between the contact surfaces will remain of such nature that a boundary lubrication, i.e. with a high coefficient of friction will remain in tact for most of the operating conditions, at least for the conditions where transmission systems are critical to scratch excitation.

The latter condition may in accordance with a specific embodiment of the invention further be promoted, by the omission of a wedge shaped entry space between the element contacting face and the carrier, i.e. other than caused by ordinary facet rounding, e.g. realised with the substantially flat shape of the saddle part of a transverse element, it is achieved that lubricating oil within the contact between saddle carrier will only be available to an extend causing so called boundary lubrication. In this lubrication state a relatively constant coefficient of friction occurs. By the shape of the saddle, it is prevented that oil accumulates before such contact in a manner that an amount of lubricant causing a mixed or a full hydrodynamic lubrication may enter the actual location of contact between carrier and element saddle.

In a so called mixed lubrication state, also in accordance with an insight underlying and part of the invention, the friction coefficient changes with changes in relative speed between carrier and transverse element. Thus in a further elaboration of the invention the distance between saddle and the so called mutual rocking edge of elements within a belt is set lower than 1 mm, preferably the rocking edge is set between 0.4 and 0.8 mm below the saddle. In this manner the maximum relative speed between the element saddle and the carrier is made lower so that by this measure, the maintenance of a boundary lubrication state is yet further promoted.

In yet a further embodiment in accordance with the invention, the lubricating oil used in conjunction with the belt is set to a very low viscosity, thereby impeding the coming into existence of a boundary or full lubrication state between element and carrier.

Thus the invention not only relates to a belt and transmission with any of the above measures, however, in particular to a belt and transmission in which the high roughness feature is combined with any one or more of the above provided set of measures.

The boundary lubrication state is in accordance with the invention preferred over the hydrodynamic lubrication state of operation of the belt since it was established by the investigations underlying the invention that the relative speeds within a belt running in a transmission, may drop to zero so that the HL lubrication condition can not in all operating conditions be maintained. Rather the friction coefficient appears to change from relatively low to relatively high with relative speed within the belt, i.e. amongst others with the instantaneous transmission ratio of the belt, together with the lubrication state in the belt which appears to dynamically shift from a hydrodynamic lubrication state, via a mixed lubrication state to a boundary lubrication state and vice versa. Thus, in accordance with a further aspect the belt is designed such, in particular is provided with such a roughness that, at least in the LOW transmission mode, the boundary lubrication state will remain, at least the coefficient of friction remains virtually constant over a considerable range of primary shaft revolutions when the belt is applied in a transmission. The LOW transmission state is in accordance with further insight underlying the transmission preferred over the OD state where also extreme relative speed differences may occur in the belt, since it is recognised that most transmission systems feature less vulnerability for scratch in this a transmission mode.

BRIEF DESCRIPTION OF THE DRAWINGS

The invention will now further be explained further by way of example along a drawing in which:

FIG. 4 represents a radial cross section of a belt, showing a transverse element and the tensile means cross section FIG. 5 is a cross section of the transverse element along the line V-V in FIG. 4, while FIG. 6 more in detail provides the cross section of the so-called saddle part in FIG. 5, to be applied in accordance with the invention at a defined roughness, preferably in combination with the carrier part of FIG. 1;

FIG. 7 is a displacement graph of a block m of the model in accordance with FIG. 3, as a function of time during stick-slip behaviour;

FIG. 8 is a schematic illustration of the interaction between a push belt transmission and meshing gear wheels of a drive train.

In the figures corresponding components are denoted by identical references.

DESCRIPTION OF THE PREFERRED EMBODIMENT

Figure 1:
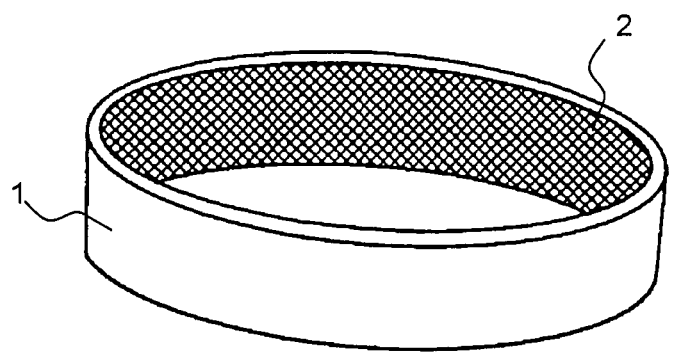
FIG. 1 represents a single ring of prior art belt, adapted in roughness in accordance with the present invention.

FIG. 1 represents a ring of a drive belt, in particular push belt as commonly known. The ring may be part of a carrier of form the same, however is in common applications like automotive personal vehicle and trucks, utilised in a nested arrangement of a plurality of circumscribing loops or rings, as may e.g. be taken from FIG. 4. Such a set of nested rings forms part or all of the belt's tensile means along which transverse elements are disposed freely moveable in the endless longitudinal direction of the belt. The elements are clamped between the sheaves of a set of pulleys and transmit rotation from one drive pulley to a driven pulley. The tensile means thereby serves to keep together the transverse elements pushing against each other. In the present example both the transverse elements and the tensile means are composed of a metal.

When the driving belt runs over pulleys having different running diameters, the variable bands of the band package have a mutual speed difference, at least in situ of one of the pulleys. This speed difference may in practice be more than 0.4 meter per second between two successive bands disposed around each other. Moreover, notably the inner bands of a carrier are pressed on to each other with substantial force, since the pressure force on a band is built up by all bands disposed outside i.e. there around.

By providing in particular the more inwardly disposed bands at least at one side with a surface profiling, through which an improved lubrication between the bands will be produced, less wear and increased life time is promoted. Preferably, the surface profiling comprises grooves, which in practice provide good results. According to a further feature, the roughening value of the surface profiling lies between 0.30 and 0.75 µm Ra, here measured according to CLA method, and preferably between 0.46 end 0.55 µm Ra. In a preferred embodiment the roughness is achieved by grooves disposed in crossing sets. The grooved profiling of a metal band is achieved by rolling a band between rollers, one roller being fitted with a surface profiling on the circumferential surface.

The drawing in FIG. 1 diagrammatically shows an endless metal band. The width of such a band may e.g. range between 5 and 20 mm and the thickness between 0.15 end 0.25 mm. The diameter of the band in circular condition may e.g. range between 150 and 400 mm. The endless band has an exterior side 1 and an interior side 2. In the known embodiment of FIG. 1, the interior side 2 is provided with a surface profiling of crosswise disposed grooves. According to a preferred embodiment of the invention all rings of a belt's tensile means are incorporated in this manner.

It is further derived from the investigations underlying the current invention that for achieving an anti-scratch adapted belt a specific, combined set of measures related to the manner of contact and the lubrication of the contact between a carrier face and the saddle is required. According to this set of measures, for lubrication of this contact, it should be promoted that a restricted amount of lubrication, i.e. oil occurs between element and carrier, the so called boundary lubrication, in combination with a relatively very much roughened surface area of both contacting faces, i.e. saddle face and the inner band facing of a carrier in order to prevent separation, ergo to maintain bounding lubrication. According to the invention, primarily, the smoothening, expressed in roughness parameter Ra, of both faces should be such that the so-called reduced roughness Ra', i.e.

$$Ra' = SQRT(Ras^2 + Rar^2) \tag{1}$$

In which
Ra'=the combined roughness parameter
Ras=the average roughness parameter of the saddle surface expressed in Ra.
Rar=the parameter for the average roughness of the inner ring face contacting the saddle.
SQRT=square root of ( . . . )

meets the requirement to be greater than 0.6 µm, preferably to remain within the area over than 0.75 µm.

Figure 2:
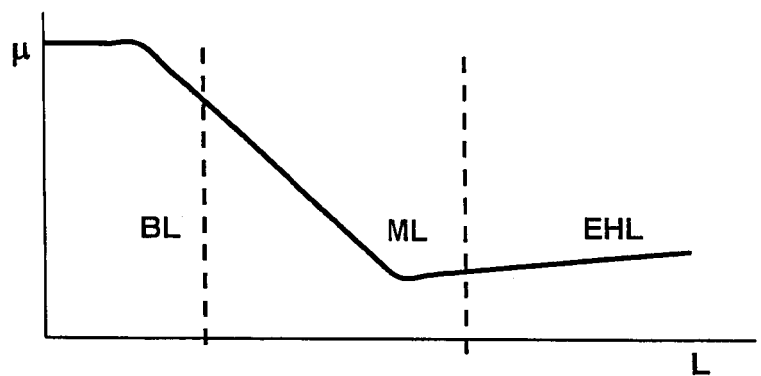
FIG. 2 is a tribological graph for the belt realised by research underlying the invention, and providing the insight upon which the invention is based.

FIG. 2 diagrammatically reflects a curved typical relation according to the invention between a friction coefficient or parameter, linearly parameterised along the Y-axis of the figure, and a "belt and oil features" parameter L, alternatively Lubrication number L, logarithmically expressed along the X-axis. The parameter L is calculated utilising the dimensionless number $$L = \frac{\eta_0 V_r}{p_{av} R_{a'}} \qquad (2)$$

in which:

L=a lubrication number or parameter in accordance with an insight underlying the invention;

Vr=the relative speed between the two contacting surfaces, here of the inner belt ring and a transverse element's saddle;

$\eta_0$=the dynamic viscosity parameter of the lubricating medium at ambient pressure;

Pav=the average Herzian stress within the band/saddle contact;

Ra'=the combined surface roughness of both saddle and ring surface as calculated by equation (1) above.

Figure 3:
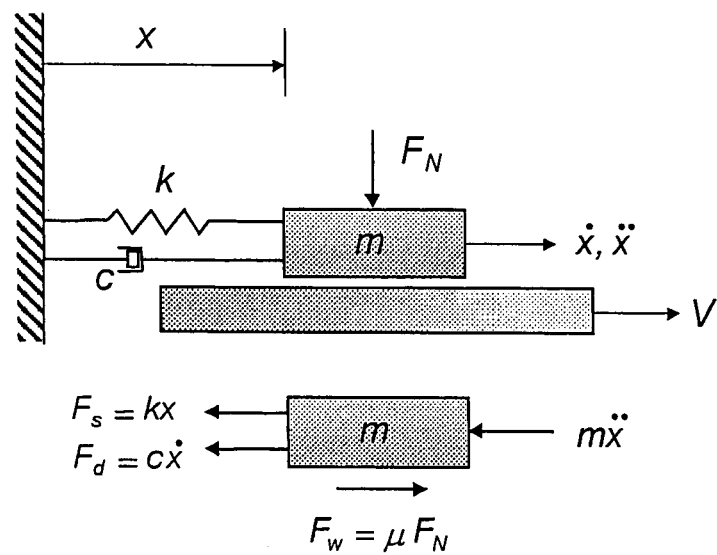
FIG. 3 is a schematic representation of an insight underlying the present invention, abstractly reconsidering the components of a belt in analogy to frictional physics.

The principal characteristic of the curved relation given by formula 1 and FIG. 3 is according to the invention determined by dominant parameters Vr, and Ra, whereas the viscosity and the average Hertzian pressure parameters are in accordance with the insight according to the invention not, at least not directly related to design parameters of the belt. The lubrication number L equation (2) according to the invention more in particular reveals that relative speed Vr is the most dominant factor for influencing the friction coefficient due to changing operation conditions, since also Ra is given once the belt is set into operation.

FIG. 2 shows in accordance with experimental results of research underlying the invention and matching the parameter line depicted in FIG. 2, that the relation between an actual friction coefficient and the lubrication parameter appears to typically follow a curve with three main sections. In the first section BL, suggestedly where so called boundary lubrication, i.e. shearing contact exists between the two contacting surfaces, the friction coefficient is virtually constant with increasing parameter L. In a second section ML, suggestedly where mixed lubrication and friction occurs, the friction coefficient drops with increasing L number, typically from somewhere like 0.16 to somewhere like 0.01. In the third section HL, where suggestedly hydrodynamic lubrication exists, i.e. with shear occurring within the lubricant and not between the contacting surfaces, the actual friction parameter has it's lowest value and again is virtually constant or may slightly increase again with increasing value of L. This section may more accurately also be denoted elasto hydrodynamic lubrication EHL.

FIG. 4 provides a cross section of a belt and a view of a transverse element, depicted according to a view in the longitudinal direction of the belt. FIG. 5 is a transverse cross section thereof over the line V-V, with the tensile means being omitted from the drawing, providing a view in a belt's axial direction. FIG. 6 in an enlarged scale depicts the in FIG. 5 encircled part of the element, in fact the part which contacts the inner face of a belts tensile means, the so called saddle of an element. In this element the roughness Ra is a part of a set of measures increased considerably over the roughness value of known commercialised belts, including an increase in roughness of the carrier.

It is a further prerequisite in accordance with the invention that for achieving the desired condition in the mutual contact, the local bending radius Rb of the band, i.e. tensile means, and of the saddle Rs should preferably be equal, thus:

$$Rb=Rs \qquad (4a)$$

Since this requirement in the practise of an operating belt can not be achieved, the design in accordance with the invention should at least fulfil that:

$$Rs>Rb \qquad (4b)$$

In accordance with a further aspect underlying the invention, the combined local radius, i.e. the reduced radius of both the saddle and the tensile means is taken into consideration by the requirement:

$$1/Rr=1/Rs+1/Rb \qquad (5)$$

in which

Rr=the reduced radius of a Carrier and Saddle face contact

Rs=the local radius of the saddle measured in mm

Rb=the instantaneous radius of the band measured in mm

It is in accordance with the invention considered that for most applications of a belt, generally Rs should range over 80 mm, whereas, whereas Rb for commonly applied transmissions typically ranges between 25 and 80 mm during operation of the Belt. For preventing that oil accumulates in the contact between carrier to an amount causing the described ML and HL lubricating conditions the element is shaped so as to avoid a wedge shaped spacing between carrier and saddle (like e.g. present in the embodiment according to FIG. 6. Since the running radius of the belt varies with the transfer ratio of the transmission, flat is defined such that any possible concave shape in the cross section of the saddle should be of a radius substantially higher than the largest running radius specified for the belt or occurring within a transmission in which the belt is to be incorporated.

Both radii are taken in accordance with the radial and longitudinal direction of a belt, considering the normal operation and configuration thereof in a pulley. More in particular it is considered that for obviating the said wedge shaped entry space at the largest amount of possible contacting locations on a saddle, without preferably the radii of saddle and band becoming equal, the saddle is preferably shaped with a non-continuous i.e. edged transition in a possible contacting surface, since from experience underlying the invention it is known that these will break, i.e. remove the lubricated condition in the mutual contact.

For even better performance of a belt and transmission in accordance with the invention, the invention provides to apply a lubricating medium in the form of an oil type having a dynamic viscosity $\eta$ lower or equal to 4 mPa*s at a nominal temperature of 100 degrees Celsius. In this manner "L" is reduced further, so that the change in lubrication condition from the BL area to the ML area in the graph is shifted to the left, i.e. the ML is even further reduced. By applying all or a majority of the different measures of the set provided by this invention the operation of a belt is optimised, for solving a scratch problem of a transmission.

In the latter respect, according to an even further aspect of the invention and preferably taken into account in the set of specific measures in accordance with the invention, the so-called rocking edge of the belt is provided less than 1 mm from the saddle surface, more in particular in a range between 0.4 and 0.8 mm below the saddle surface. In this manner it is achieved to decrease the relative velocity Vr between saddle and tensile means, alternatively denoted carrier, in particular at the extreme OD and LOW ends of the range of ratios in which the belt will operate. In combination with any, preferably all of the previous measures this measure appears to diminish the occurrence of so called rattle in a transmission, at least the transmission appears to become less prone to being urged into such state, be it to the expense of some loss of efficiency in performance of the belt, in particular in the LOW and OD areas of the belt's range of transmission ratios.

FIG. 3 illustrates a mathematical model taken into consideration and developed at developing the insight underlying the claimed invention, of the friction occurring within the belt. In the model, it shows that changing the friction force $F_w=\mu F_N$, will lead to changes in the spring force $F_s=kx$, which may lead to vibrations if the damping force ($F_d=c\dot{x}$) is not sufficient. It has been distinguished between dynamic frictional behaviour due to external excitation and self (or internal) excitation. The value for the friction force $F_w$ is in this model interchanged with a result of two factors: coefficient of friction $\mu$ and normal force $F_N$ (considered that $F_w=\mu F_N$). The external form can lead to vibrations due to a (periodical) change in normal force, e.g. $F_N(t)=\sin(\omega t)$. For example the pressure fluctuations in the pulleys will lead to a change in normal force with time in the contact between saddle and ring in the CVT.

Attention will now be paid to the self or internal excitation form, which in accordance with the idea underlying the invention, may lead to vibrations due to a change in coefficient of friction with relative velocity.

In case of self excitation 'Classical' stick-slip, where the coefficient of friction changes when going from static to kinetic friction, is distinguished, as well as Stick-slip-related, or $\mu_k$-$V_r$ dependent behaviour, where in a system already in motion (only slip) the kinetic coefficient of friction changes with relative velocity $V_r$.

Classical stick-slip arises when the coefficient of static friction is greater than the coefficient of kinetic friction. In the model of FIG. 3, the block with mass m will stick to the lower surface if the coefficient of friction is sufficiently large at the equilibrium position when moving it along with an absolute velocity of value $\dot{x}=V$. During the stick period the force relationship may be written as $$cV+kx<\mu_s F_N \quad (6)$$

During the stick, the spring force increases with time at a rate kVt (or kx) as the slider is displaced from point A to point B as indicated in FIG. 7. Up to point B, the static friction force is capable of withstanding the combined restoring forces consisting of the constant damping force cV and the increasing spring force kx. At point B, the restoring forces overcome the static friction force $\mu_s F_N$ and slip occurs to point C.

Considering the slip-phase the motion of the mass or block "m in FIG. 3 is described by the equation $$m\ddot{x}+c\dot{x}+kx=\mu_k F_N \quad (7)$$

It is assumed that at a certain moment $\mu_k$ decreases with increasing relative velocity $V_r$ according to hydrodynamic action effects in the lubricated contact. For the moment only the dependency of $\mu_k$ with $V_r$ is considered. An extension to other parameters of influence, important for design recommendations, will be given further on.

As a first approximation the dependency of $\mu_k$ with $V_r$ can be modelled by a linear relationship with a certain negative slope ($\alpha$) according to $$\mu_k=\mu_k^0-\alpha V_r \quad (8)$$

The expression (3) for $\mu_k$ can be substituted in equation (7), with $$V_r=V-\dot{x} \quad (9)$$

which yields the following equation $$m\ddot{x}+(c-\alpha F_N)n\dot{x}+kx=(\mu_k^0-\alpha V)F_N \quad (10)$$

In accordance with the insight underlying the invention, the slope $\alpha$ has been introduced in the damping term. Here it acts in a negative way. A negative damping coefficient feeds energy into the system and makes vibrations and even resonance possible. It is thus demonstrated by the development underlying the current invention that when the resulting amplitudes and frequencies match certain critical system characteristics of the gear set gear rattle will occur.

It is also demonstrated that unlike what quite often is assumed, stick is not a necessary condition for the occurrence of rotational vibrations. Rather the behaviour of the change in coefficient of friction with velocity may lead to these vibrations. Furthermore it should be noticed that any disturbance in the transmission may lead to excitation of the mass-spring-damper-friction system due to the inherent unstable nature of this system.

Further in accordance with the idea underlying the invention, the mass-spring-damper-friction model is applied to the push belt/variator, at which, e.g. in Low, the following simplification is made regarding the belt and transmission as shown in modelled FIG. 8. In the dynamical system of the variator only relative motion between saddle and ring, as source, and vibrations of the secondary axis in the variator, as effect, are considered. The absolute movement of a stating belt is here not taken into consideration since, in accordance with the insight underlying the invention it does not play a role in triggering transmission scratch.

The mass, in particular the vibrating mass in the model according to FIG. 8 is represented by the secondary axis in the transmission according to the invention. The element string constitutes the spring when the stiffness is considered and also plays a damping role. The element string will be formed by different elements in time due to the dynamic nature of the system. Two situations can be distinguished. The first situation is defined in that the element string is not loaded in a way that compressive forces are able to overcome the endplay (the so-called 'lose part'). The second situation is when there is no play, i.e. end play, in the belt anymore, which is the case in the 'push part' occurring during operation of the belt. According to the first situation, when there is some amount of endplay in the element string, this part, which is considered to feature certain stiffness and damping, does not have to be taken into account. However in the second situation, when there is no endplay, this part, having a characteristic stiffness and damping, is however considered in the model developed in accordance with the ideas underlying the invention.

Friction occurs between the saddle and ring on the primary pulley. The normal force in this contact is the parameter $F_N$ used in the model. The ring is moving relatively to the elements in the primary pulley with a certain relative velocity V. The overall relative velocity $V_r$ i.e. V superimposed with vibration $\dot{x}$, which is crucial for the frictional behaviour, is according to equation (9).

At applying the developed model to predict the amplitudes and frequencies of vibration, it is considered that the gears limit this vibration form by means of the play that exists between the teeth of the gears pertaining to a transmission according to the invention. Therefor two situations are distinguished. First, if the amplitude of vibration is greater than the play between the gear teeth, gear rattle may occur two sided. Second, if this amplitude is smaller then gear rattle may occur single sided.

The gear set as shown in FIG. 8 is only for illustrative purposes. It will be explained using the model described along FIG. 3, while the individual effects of changes in the governing operational variables are in accordance with the invention identified. The following variables are identified:

m—mass of the secondary axis
c—damping coefficient
k—spring stiffness of the element string
$F_N$—normal force in the saddle-ring contact
$\mu_k$—kinetic coefficient of friction dependent of the tribology in the saddle-ring contact The combination of the items mentioned above is responsible for the system behaviour regarding rotational vibration. The last item, which concerns the influence of tribology aspects on the kinetic coefficient of friction, has been paid special attention to. In the lubricated saddle-ring contact the coefficient of friction is a dynamic parameter depending on variables like relative velocity, viscosity, temperature, pressure and roughness.

Another important parameter is the play between the elements. If there is some amount of play, e.g. in case of the so called 'lose part' of a belt operating in a transmission and when the amplitude of the vibration is not exceeding the play, the stiffness and damping of this part do not have to be taken into account. Then only the stiffness and damping of the push part have to be considered.

The dynamic behaviour of the coefficient of friction is represented in the tribological curve for the push belt (FIG. 2). In this curve the coefficient of friction is mapped as a function of the dimensionless number L defined by equation (2), utilising the combined roughness defined in equation (1).

In equation (11), the lubrication number L is incorporated, instead of only in the motion equation. This yields $$m\ddot{x} + \underbrace{\left(c - \frac{\alpha\eta_0}{p_{av}R_a}F_N\right)}_{1}\dot{x} + kx = \underbrace{\left(\mu_k^0 - \frac{\alpha\eta_0}{p_{av}R_a}V\right)}_{2}F_N \quad (11)$$

Equation (11) shows two counteracting terms when vibration is concerned. The equation makes clear that the amplitude of vibration increases if term 1 decreases and/or term 2 of equation (11) increases. Therefore the parameters in term $$\frac{\alpha\eta_0}{p_{av}R_a}$$

have both a positive and negative effect on the amplitude. The net result follows from the governing system parameters.

Figure 9:
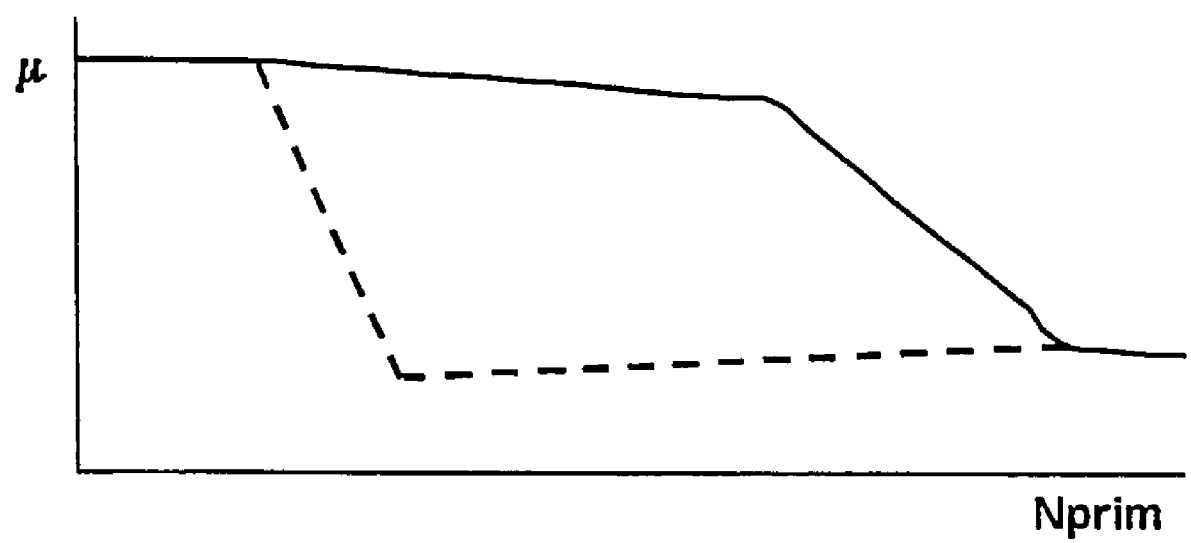
FIG. 9 is a representation of characteristic belt and transmission feature realised by the invention.

In the above representation of the tribological curve for the belt, the hydrodynamic action of the contact is assumed. i.e. increase in hydrodynamic separation, i.e. film thickness over roughness, leads to a decrease in the coefficient of friction, i.e. leads to a shift from a boundary lubrication state (BL) to a mixed lubrication state (ML) for low values of L and assuming that friction is constant in the boundary lubrication regime. In FIG. 9 it illustrates that with at least a plurality of the measures of the set provided by the invention, a high coefficient of friction is maintained for a considerable part of a common range of rotational speeds of the primary shaft. The belt hereby runs in a LOW transmission ratio, which appeared the most scratch triggering transmission mode. The belt feature illustrated in this graph comprises that the friction coefficient remains virtually constant, i.e. does not decrease more than about 10% up to a predetermined value of the speed of the primary shaft, here over a major part of the transmissions regular range of transmission ratios. In this FIG. 9 the dotted line illustrates the dependency of the coefficient of friction without any of the measures according to the invention being taken.

In a preferred embodiment of the invention so much of the set of measures is applied such that the critical constant high value of the friction coefficient is maintained up to a primary speed value of 4000 RPM, More preferably however, this state is maintained in the said LOW transmission mode up to 6000 RPM.

The invention further relates to all details of the figures pertaining to the description and all features defined in the following claims.

The invention claimed is:

1. Transmission provided with a composite driving belt provided with a carrier and a plurality of transverse elements assembled freely slidable thereon, the carrier comprising one or more bands, the bands disposed radially around each other, each element being provided with a radially outward directed carrier contact plane for contacting a radial inner contact plane of said carrier while in operation and the carrier contacting face of the transverse element and the inner contacting face of the carrier contacting the contact face, the element having a combined roughness Ra' that is more than 0.6 µm, wherein, $Ra'=SQRT(Ras^2+Rar^2)$, Ras being the average roughness parameter of the carrier contacting face of each transverse element expressed in terms of the Ra surface roughness ISO-standard, and Rar being the average roughness parameter of the carrier inner contact face of the innermost endless band expressed in terms of the Ra surface roughness ISO-standard, characterised in that, the belt operates under lubricated conditions in the transmission, which are provided by a lubricating oil, characterised in that the lubricating oil has a dynamic viscosity η lower or equal to 4 mPa*s, at a nominal temperature of 100 degrees Celsius.

2. The transmission according to claim 1, characterised in that the combined roughness Ra' is larger than 0.75 µm Ra.

3. The transmission according to claim 2, characterised in that the roughness of the carrier inner inward facing (2) is larger than 0.8 µm Ra.

4. The transmission according to claim 2, characterised in that when the belt is operated in a LOW mode of transmission, the friction coefficient between the carrier and an element remains at least virtually constant over a major part of the regular range of primary shaft rotation speeds to be transmitted.

5. The transmission according to claim 1, characterised in that the roughness of the carrier inner inward facing (2) is larger than 0.8 µm Ra.

6. The transmission according to claim 5, characterised in that when the belt is operated in a LOW mode of transmission, the friction coefficient between the carrier and an element remains at least virtually constant over a major part of the regular range of primary shaft rotation speeds to be transmitted.

7. The transmission according to claim 1, characterised in that when the belt is operated in a LOW mode of transmission, the friction coefficient between the carrier and an element remains at least virtually constant over a major part of the regular range of primary shaft rotation speeds to be transmitted.

8. Transmission of claim 1, wherein said carrier is a plurality of endless metal bands.

9. The transmission according to claim 1, wherein, the belt operates under lubricated conditions in the transmission, which are provided by the lubricating oil, having a dynamic viscosity $\eta$ lower or equal to 4 mPa*s, at a nominal temperature of 100 degrees Celsius, with the dynamic viscosity allowing a oil film in between contact surfaces to remain of such nature that a boundary lubrication will remain intact for operating conditions while preventing oil accumulation in a manner that an amount of lubricant causing a mixed or a full hydrodynamic lubrication from entering an actual location of contact between the carrier and the element.

10. The transmission according to claim 9, wherein, the boundary lubrication will remain intact for a LOW transmission mode operating condition, the LOW transmission mode operating condition extends to a primary speed value of 4000 RPM.

11. The transmission according to claim 9, wherein, the boundary lubrication will remain intact for a LOW transmission mode operating condition, the LOW transmission mode operating condition extends to a primary speed value of 6000 RPM.

12. The transmission according to claim 1, wherein,
the belt operates under lubricated conditions in the transmission, which are provided by the lubricating oil, having a dynamic viscosity $\eta$ lower or equal to 4 mPa*s, at a nominal temperature of 100 degrees Celsius, with the combined roughness and the dynamic viscosity allowing an oil film in between contact surfaces to remain of such nature that a boundary lubrication will remain intact for a LOW transmission mode operating condition while preventing oil accumulation in a manner that an amount of lubricant causing a mixed or a full hydrodynamic lubrication from entering an actual location of contact between the carrier and the element, the boundary lubrication provides that a shearing contact exists between the contacting surfaces, the friction coefficient is virtually constant with increasing parameter L, L is calculated utilising the dimensionless number $L=(\eta_0 V_r)/(p_{av} R_a')$ in which
L=a lubrication number or parameter in accordance with an insight underlying the invention,
Vr=a relative speed between the contacting surfaces,
$\eta_0$=a dynamic viscosity parameter of the lubricating oil at ambient pressure, and
Pav=an average Herzian stress within a band/saddle contact.

13. The transmission according to claim 12, wherein, the LOW transmission mode operating condition extends to a primary speed value of 4000 RPM.

14. The transmission according to claim 12, wherein, the LOW transmission mode operating condition extends to a primary speed value of 6000 RPM.

* * * * *